June 14, 1938.  E. S. RINALDY ET AL  2,120,812
ANIMAL TRAP
Filed June 26, 1937
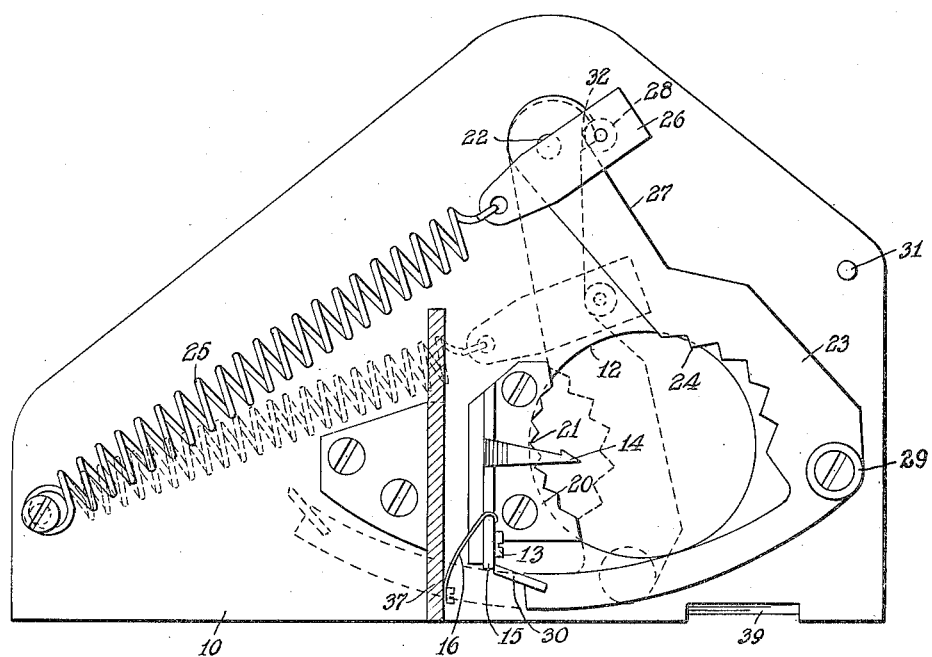
INVENTORS
EDWARD S. RINALDY AND ADAM SCHAEFER
BY *Fred'k T. Schuetz*
ATTORNEY.

Patented June 14, 1938

2,120,812

UNITED STATES PATENT OFFICE 2,120,812

ANIMAL TRAP

Edward S. Rinaldy and Adam Schaefer,
Chester, N. J.

Application June 26, 1937, Serial No. 150,452

10 Claims. (Cl. 43—85)

The invention relates to traps for rodents and the like, being adapted particularly for catching and killing rats.

It has for an object the provision of a trap which may be baited after the trap has been sprung as well as in a non-set or retracted position, eliminating thereby the danger of inadvertently springing the trap with possible injury to the person setting the same.

A further object of the invention resides in the provision of a construction whereby the release mechanism is of the hair-trigger type, only a very slight force being required to spring the trap, increasing rapidly, however, to exert the required holding force.

A still further object of the invention is to provide a trap wherein the animal must follow a predetermined course leading it eventually to a position for reaching the bait wherein holding elements will be caused to grip and kill the animal when the trap is sprung.

The invention has for another object a trap of simple and inexpensive construction and which is effective in operation and in which the setting mechanism is readily manipulated.

In carrying out the invention, a suitable base or support is provided, which may be, for example, in the nature of an inverted open box having an opening or openings in its side walls for entrance of the animal and a single opening in the top through which the bait is accessible. The entire trapping mechanism is carried on this top or support and comprises essentially a fixed jaw member bordering a portion of the top opening and a lever fulcrumed to the top for movement in the plane of said fixed jaw member and across the said opening, the said lever having also a jaw portion adapted for juxtaposition to the fixed jaw member.

In addition, said lever at its jaw end is provided with an extension continuing about and beyond the said opening and terminating in a detent. The latter is designed to engage a tiltable bait-holder or bell-crank trigger element, one arm of which is positioned above said opening to receive the bait. A slidable member is provided over said lever for movement along a side edge thereof between the lever fulcrum and the said top opening, and is spring-drawn to pull the said lever across the opening. When substantially in line with said fulcrum, or in a dead-center position, the member is drawn with a minimum or practically no force and consequently exerts only the slightest pull on the lever which is designed with respect to the slide member such that the pull thereon is not applicable fully until the trap is sprung when it increases rapidly and materially.

The nature of the invention, however, will best be understood when described in connection with the accompanying drawing, in which:

Fig. 1 is a plan view of the novel trap with a portion of the housing element broken away to disclose the gripping mechanism.

Fig. 2 is a side elevation thereof with the housing shown in vertical section and part elevation.

Referring to the drawing, 10 designates a suitable base or support member, indicated in the present embodiment as an inverted box-like structure provided with an opening or openings 11 in a side wall and through which the animal may enter the trap. There is provided also a circular opening 12 in the top, these openings being designed to predetermine the course of the animal so that it will be required to enter the opening 12 to reach the bait. This will be held on a tiltable trigger element 14 pivoted at 13 to a bracket secured to the support 10. This element has its one arm extending over the opening 12 to receive the bait, while its other arm 15 acts as a stop for a detent hereinafter set forth. The arrangement is such that as the arm 14 is disturbed by an animal, for example, raised, the detent stop 15 will be moved to spring the trap, said trigger element being normally under the influence of a spring 16 operating to move the arm 14 in a direction opposed to that which would spring the trap, that is to say, downwardly toward the base 10.

The gripping mechanism of the trap comprises a fixed jaw member 20 secured to the base with a preferably toothed marginal portion 21 bordering a portion of the opening 12, and a movable lever fulcrumed at 22 to the base having one arm 23 provided with a jaw portion, also preferably toothed as at 24, designed to be brought into juxtaposition to the toothed portion 21 of the fixed jaw member. The arm 23 is designed to move in the plane of said fixed jaw member across the opening for gripping an animal when the trap has sprung and under the action of a spring 25 secured at one end to the base and drawing normally the said arm 23 toward the jaw member 20. The other end of the spring connects with a member 26 slidable along one side edge 27 of the arm 23 between said fulcrum 22 and the opening 12 to vary the effective leverage of said arm.

The gradient of the edge 27 is made such that as the member 26 progresses from the fulcrum toward the opening, the application of the force of spring 25 will be rapidly accelerated so that ample force for gripping the animal will be available and its application almost instantaneous. To effect a smooth action in this respect, it is preferred to provide the member 26 with a roller 28 bearing against the edge 27, the said member 26 to this end embracing at its outer end the said lever arm 23 and carrying between the turned-over portions said roller, as shown.

The said arm 23, furthermore, is provided with an extension at the jaw end, the same being arcuate to extend about and beyond the opening 12 and carrying at its outer and free end a detent 30 designed to contact the stop 15 when the trap is set and as indicated in the full-line position, Fig. 1 of the drawing. In this position, moreover, it will be noted that roller 28 is at the innermost portion of the arm 23 substantially in line with the fulcrum 22 so that very little force is exerted by the spring 25 to move said lever arm 23. Consequently, only a very slight force will be required to trip the arm 14 and spring the trap. When this occurs, the arm will take the position indicated in the dotted lines, bringing the two jaw members together about an animal to securely hold and kill the same.

In releasing the trap as for resetting a knob 29 is provided on the lever; and it will be appreciated that the force required diminishes as the lever arm is brought outwardly. A stop 31, in the nature of a pin extending upwardly from the base 10, may be provided to limit its outward swing. By providing a shoulder 32 on the opposite end of the lever, travel of roller 28 will also be limited to fix the minimum pull upon the arm 23 of said lever.

To prevent access to the bait from the top of the trap, a suitable housing or cover member 35 is provided, the same being hinged as at 36 to an upstanding bracket 37 secured to the base, said cover extending over the opening 12 and trigger mechanism. It is provided, furthermore, with a spring-catch 38 designed to fit a notch or keeper 39 in the side of the support member 10.

We claim:

1. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, and resilient means drawing said lever toward the fixed jaw through said slidable member.

2. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, resilient means drawing said lever toward the fixed jaw through said slidable member, and a housing hinged to said support for enclosing the trigger element and opening.

3. An animal trap, comprising a box-like support having an entrance opening in a wall thereof and having an opening in its top through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, and resilient means drawing said lever toward the fixed jaw through said slidable member.

4. An animal trap, comprising a box-like support having an entrance opening in a wall thereof and having an opening in its top through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, and a spring secured at one end to the top of the box-like structure and at its other end to the slide member and between the lever fulcrum and the said opening.

5. An animal trap, comprising a box-like support having an entrance opening in a wall thereof and having an opening in its top through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, resilient means drawing said lever toward the fixed jaw through said slidable member, and a stop extending upwardly from the said top to engage the lever to limit its outward movement.

6. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever also having an arcuate extension extending beyond and about the said opening and terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, and resilient means drawing said lever toward the fixed jaw through said slidable member.

7. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, resilient means drawing said lever toward the fixed jaw through said slidable member, and a member carried by the lever for manual operation of the same to retract the lever in setting the trap.

8. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a slide member having an end embracing the said lever and a roller carried by said end between its turned-over portion for engagement with the side edge of the lever, and resilient means attached to the other end of the slide member and to the support between said opening therein and the fulcrum of the said lever.

9. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a slide member having an end embracing the said lever and a roller carried by said end between its turned-over portion for engagement with the side edge of the lever, said edge tapering for a portion toward the said opening, and resilient means attached to the other end of the slide member and to the support between said opening therein and the fulcrum of the said lever.

10. An animal trap, comprising a support having an opening through which the head of the animal must pass to reach the bait, the opening over a portion being bordered by a fixed jaw member, a lever fulcrumed to the support for movement in the plane of said fixed jaw member across said opening and having a jaw portion for juxtaposition to the fixed jaw member, said lever having also an extension at the jaw end terminating in a detent, a trigger element pivotally carried by the support, one arm of which element is adapted for engagement with said detent and the other to be positioned above the said opening and adapted to retain the bait, a member slidable along the lever between said opening and the lever fulcrum and substantially to the latter, and resilient means drawing said lever toward the fixed jaw through said slidable member, the arm of said lever beyond its fulcrum being provided with a nose or stop to limit the movement of the slidable member in a direction away from said opening.

EDWARD S. RINALDY.
ADAM SCHAEFER.